Patented Feb. 9, 1932

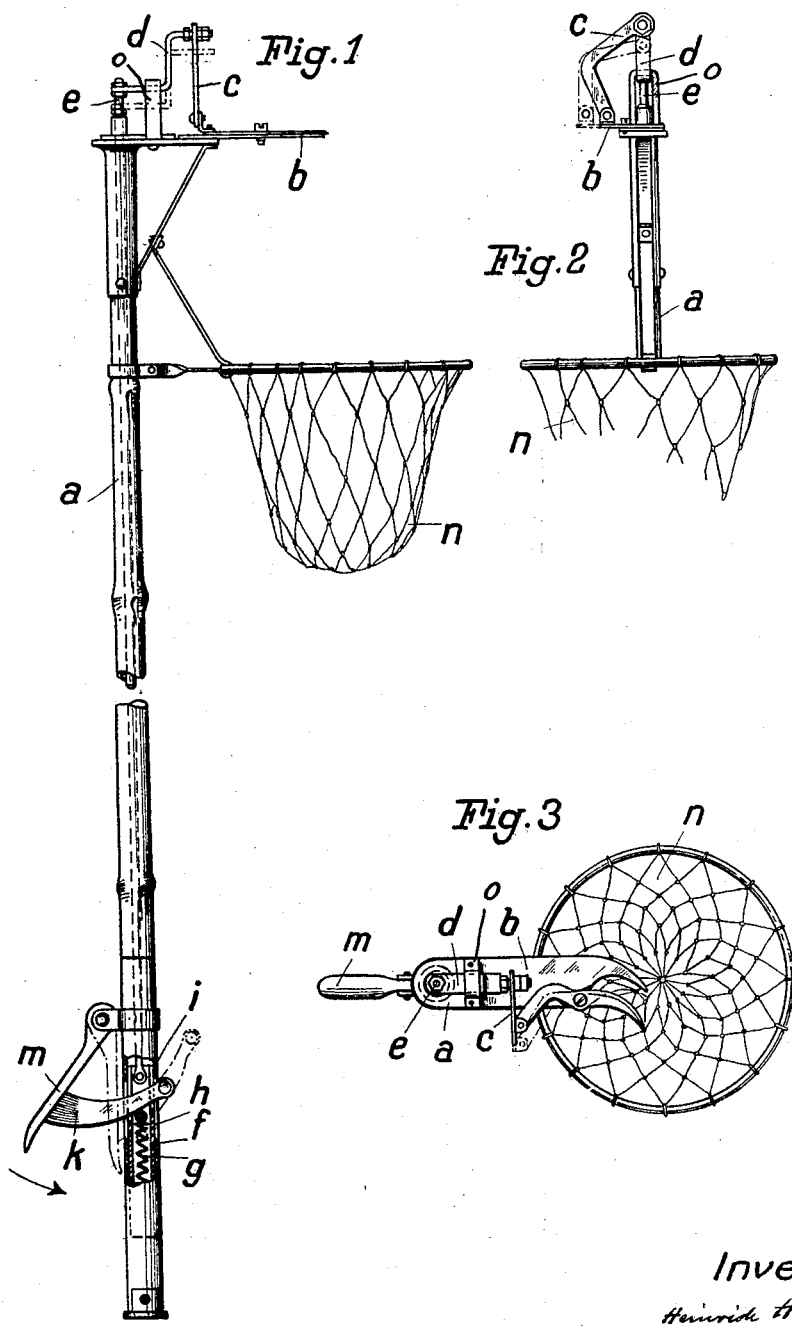

1,844,158

UNITED STATES PATENT OFFICE

HEINRICH HAIN, OF BERLIN, GERMANY

FRUIT PICKER

Application filed December 23, 1930, Serial No. 504,283, and in Germany December 1, 1930.

This invention relates to a fruit picker. For this work garden shears were hitherto employed, one arm of which is fixed on the top end of a suitably long stick, whereas to the other arm a rope is attached which must be pulled, in order to close the shears. This manner of operation is tiresome and wastes time.

The present invention relates to a fruit picker which can be easily and conveniently operated with one hand.

This is obtained according to the invention in that an elbow lever is connected to one arm of the shears fixed at right angles to the top end of a suitably long stick and pressed into closing position by means of a crank as soon as a pull is exerted on this crank by means of a rod connected thereto and passing through the stick, which rod is actuated by a hand lever hinged to the lower end of the rod, a wedge-shaped segment, attached to the hand lever and passing through a sleeve arranged at the lower end of the rod, shifting this sleeve towards the end of the stick.

An embodiment of the invention is illustrated by way of example in the accompanying drawings in which:—

Fig. 1 shows the picker in side elevation, partly in section.

Fig. 2 is a front elevation of the upper end of the stick.

Fig. 3 is a top plan view of Fig. 1.

On the upper end of a suitably long stick $a$ made of bamboo or some other suitable material, a pair of shears $b$ is fixed. To one arm of these shears an elbow lever $c$ is hingedly connected, the other end of this lever being connected by a crank $d$ with a rod $e$. The lower portion of crank $d$ is supported by a bracket $o$. The rod $e$ extends through the stick and terminates at the lower end thereof in a sleeve $f$ acted upon by a spring $g$. This spring $g$ tends to shift the sleeve with the rod upwards to the point of the stick. The sleeve $f$ and the stick $a$ are slotted and through these slots $h$ and $i$ a wedge-shaped segment $k$ extends, which is mounted on a hand lever $m$ hinged to the stick $a$.

If this hand lever $m$ is brought into the position shown in dash-dot lines in Fig. 1, the segment $k$ pushes the sleeve $f$ towards the lower end of the stick $a$. The sleeve $f$ carries the rod $e$ along and this rod $e$ makes the elbow lever $c$ oscillate by means of the crank $d$ so that the shears $b$ are closed and the apple or other fruit drops into a net $n$ fastened to the stick $a$.

I claim:—

A fruit picker, comprising in combination a suitably long stick having a slot at its lower end, shears fastened at right angles to and on the upper end of said stick, an elbow lever connected at one end to one arm of said shears, a crank connected at one end to the other arm of said elbow lever and adapted to oscillate said elbow lever and close said shears, a rod connected to the free end of said crank extending through said stick and adapted to actuate said crank, a slotted sleeve on the lower end of said rod, shiftable in said stick, a wedge-shaped segment extending through the slots in said sleeve and in said stick adapted to shift said sleeve and said rod towards the lower end of said stick, and a hand lever hingedly connected to said stick and fixed to said wedge-shaped segment and adapted to push said segment through the slots in said stick and in said sleeve.

In testimony whereof I affix my signature.

HEINRICH HAIN.